United States Patent [19]

Hu

[11] Patent Number: 4,569,242

[45] Date of Patent: Feb. 11, 1986

[54] RAPID ADVANCING AND RETRACTING MECHANISM FOR CLAMPING DEVICE

[76] Inventor: Anny Hu, 102, Sec. 1, Nei Hu Rd., Taipei, Taiwan

[21] Appl. No.: 409,973

[22] Filed: Aug. 20, 1982

Related U.S. Application Data

[63] Continuation-in-part of Ser. No. 257,875, Apr. 27, 1981.

[51] Int. Cl.$^4$ .............................. F16H 1/18; F16H 1/20
[52] U.S. Cl. .............................. 74/424.8 A; 74/424.8 R
[58] Field of Search .............. 74/424.8 A, 424.8 R; 269/173, 174; 411/433, 432

[56] References Cited

U.S. PATENT DOCUMENTS 2,393,764  1/1946  Frank ................................. 269/174
2,736,227  2/1956  Stroble .............................. 411/433
4,156,368  5/1979  Jackson ........................ 74/424.8 A Primary Examiner—Leslie A. Braun
Assistant Examiner—Michael D. Bednarek
Attorney, Agent, or Firm—Armstrong, Nikaido, Marmelstein & Kubovcik

[57] ABSTRACT

The present invention relates to an improved mechanism for clamping means comprising a pair of split nuts resiliently retained in place inside a hollow cylindrical body by spring means, which mechanism can either slidably hold the screw spindle to allow the latter to be rapidly pushed to its working position or retracted to dismount the workpiece when the threads of split nuts are not in mesh with the screw spindle, or offer a snug, complete engagement between the split nuts and screw spindle in which the load is equally distributed, thereby largely reducing the wear thereof, and allowing the device to be fabricated relatively small in size.

4 Claims, 7 Drawing Figures

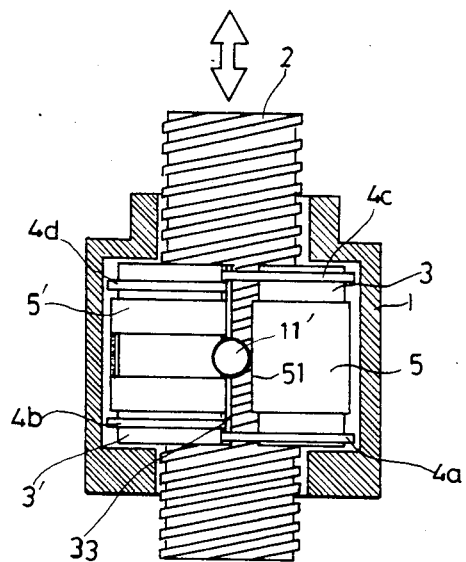
FIG 1-A
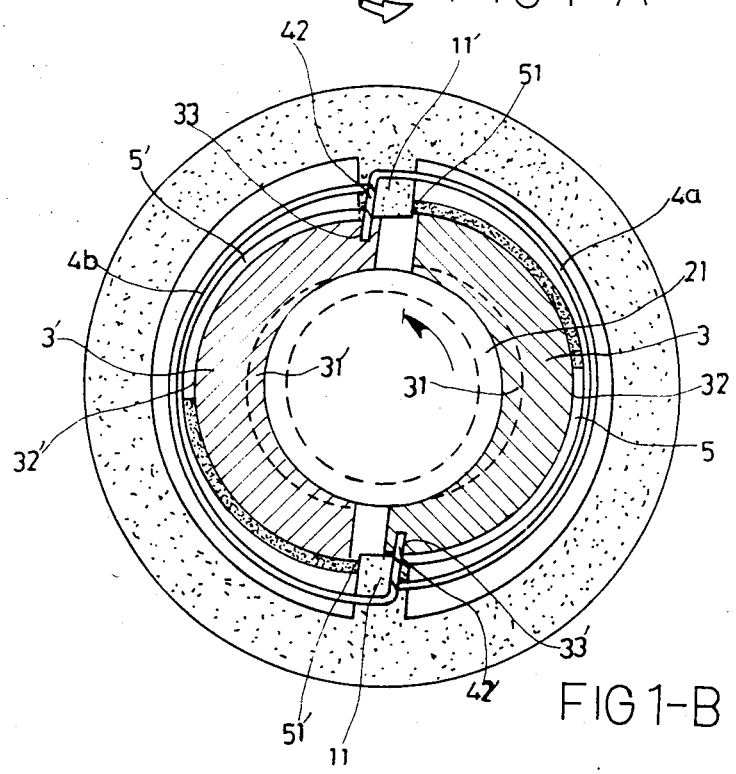
FIG 1-B

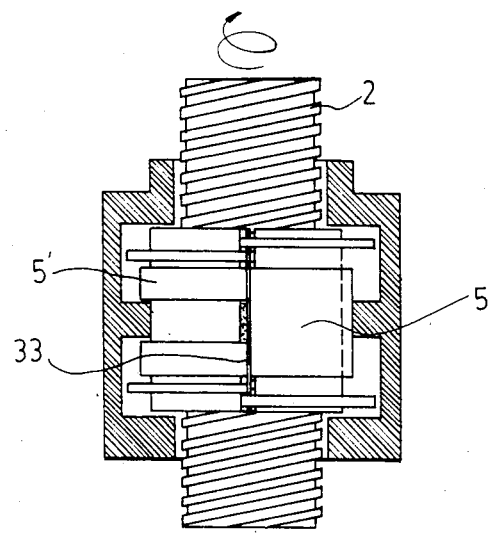
FIG 2-A
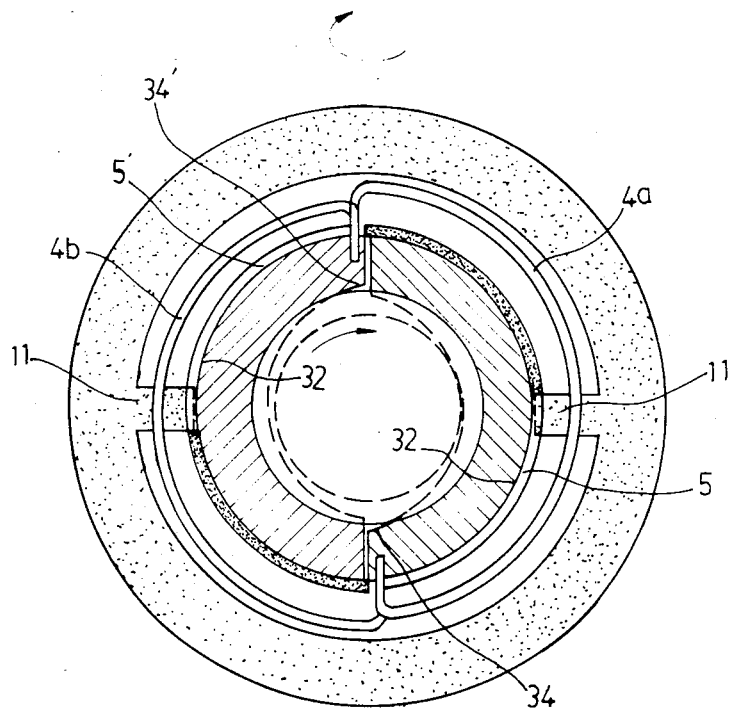
FIG 2-B

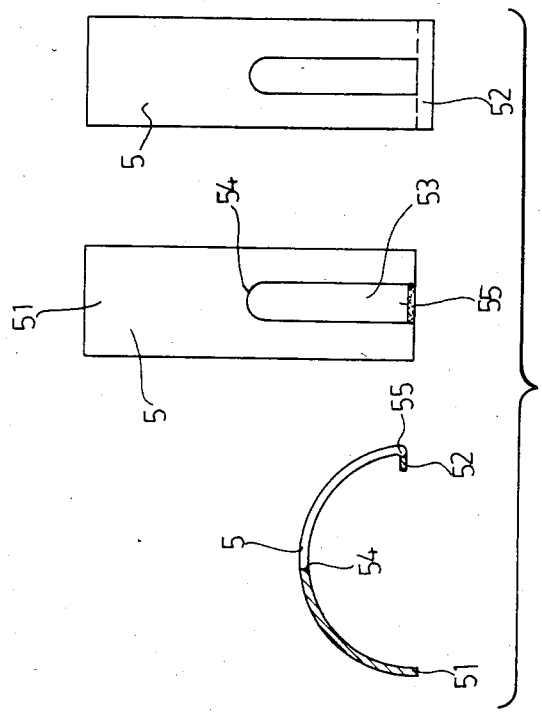
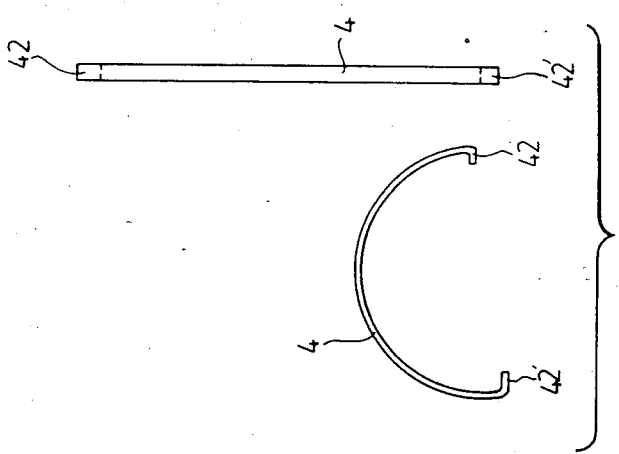

RAPID ADVANCING AND RETRACTING MECHANISM FOR CLAMPING DEVICE

The application is a Continuation-in-part application of Ser. No. 257,875 filed on Apr. 27, 1981.

The parent application related to a rapid operating mechanism for advancing or retracting the screw spindle of clamping means, for example clamps, vises, and suchlike. The improvement of this invention over its prototype resides in replacing the latter's springs by springs and stop pieces, so as to facilitate the production, and more effectively release the split nuts.

Yet known clamping devices fall into two categories: manual type, and hydraulic type. Despite its relatively high cost of production, the application of the former is much limited due to the structure thereof, and adapted only to special c-clamps. Moreover, such device entails a preparatory step to set the screw in operating position and is therefore inconvenient. For this reason, it is not preferably accepted by the public. While the cost of production of the latter is also high, it is not adapted to ordinary use. Provided with hydraulic chamber, the layout of such device is inconveniently bulky, thus limiting its application to some specialized works.

A yet known means to obtain a rapid advance or retract of clamping means to fasten or release the workpiece is accomplished by an eccentric nut provided with thread means on half of its internal surface, which nut, normally does not engage with the screw spindle, yet when turned forwardly about half a round inside a hollow cylindrical body in the frame, will produce a radial displacement such that its half-threads engage with the screw spindle penetrating through it. Rapidly as it can fasten or release the workpiece, such device suffers several disadvantages as follows:

1. Since only half of the inner wall is provided with thread, the load is mostly exerted on the threaded portion in operation, therefore largely increasing the wear of the thread and screw spindle. Moreover, such device cannot convert the torsion of the operator completely and efficiently into the pressure against the workpiece, particularly when the load is heavy.

2. The provision of a cylindrical body and the eccentric nut renders the inconveniently large size of the resulting assembly, which largely limits the use of such device. Also, the nut must provide enough number of threads to convert the angular torque into axial thrust, thus the required length is also inconveniently long.

3. In operation, only three effort points are bearing the propulsion of the screw spindle, thus causing the wear of the entrance and the exit of the cylindrical body, and enlarging the size of the opening thereof after long use, so that the screw spindle is liable to slacken during operation and fails to hold the workpiece snugly and securely in place.

Accordingly, it is the chief object of this invention to provide a rapid advancing and retracting mechanism to supercede the yet known means, thereby curing the deficiecies of the latter.

This invention concerns an improved rapid mechanism for advancing and retracting the screw spindle by means of a pair of split nuts which constrict to knuckle the screw spindle when the latter is turned in obverse direction (i.e. the direction which results in advance) and expand to release the screw spindle when the latter is turned in reverse direction (i.e. the direction which results in retract). Unlike the aforementioned prior art, the load is equally distributed to the two split nuts as well as the periphery of the screw spindle, thus largely reducing the wear thereof.

Additional objects of my invention will be brought out in the following description of a preferred embodiment of the same taken in conjunction with the accompanying drawings wherein:

BRIEF DESCRIPTION OF THE DRAWING

FIG. 1A is an axial sectional view of this invention;

FIG. 1B is a cross section of this invention showing the slackened state of the split nuts, in which the screw spindle is advanced or retracted directly;

FIG. 2A is another axial sectional view of this invention;

FIG. 2B is another cross section of this invention showing fastened state of the split nuts, in which the screw splindle is in mesh with said nuts;

FIG. 3 shows the plan view and edge view (after bent into an arc) of a spring;

FIG. 4 shows the plan views (both sides) and the edge view (after bent) of a stop piece;

DETAILED DESCRIPTION OF PREFERRED EMBODIMENTS

Figure 5:
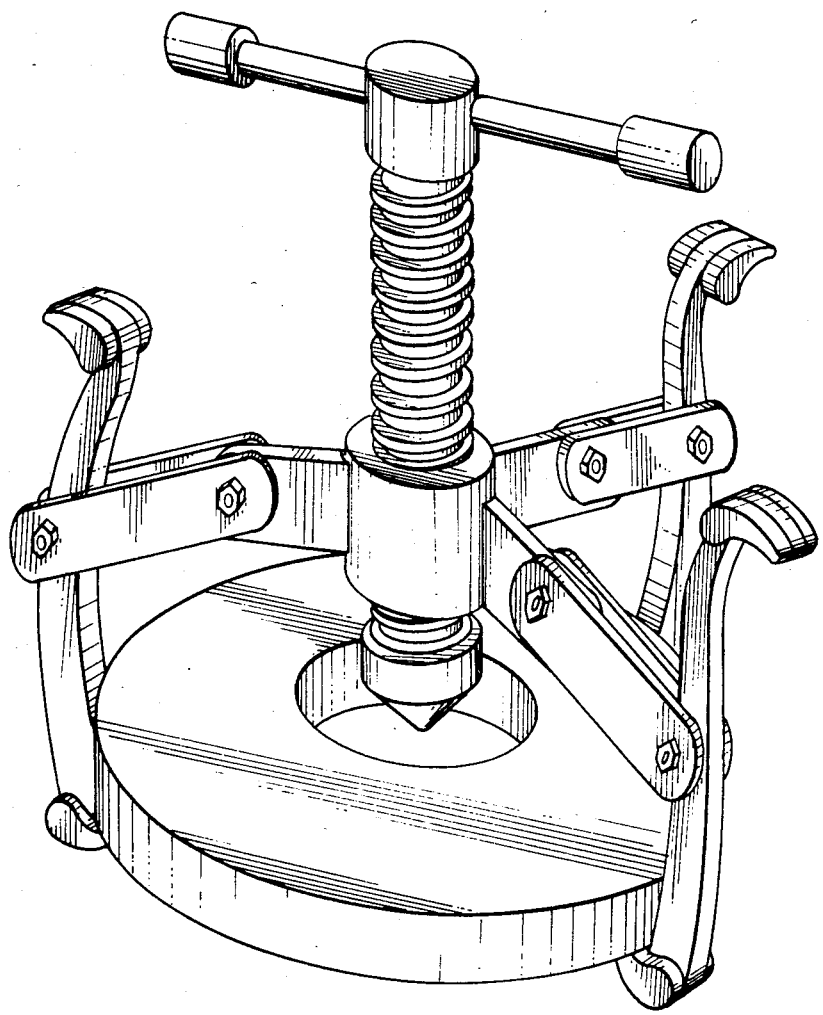
FIG. 5 is an embodiment of this invention.

Referring to FIGS. 1A and 1B, this invention comprises substantially a hollow cylindrical body (1) for receiving a pair of split nuts (3) (3') resiliently retained in place. The inner side of each split nut (3) (3') is provided with female threads (31) (31') which exactly match the male threads (21) of screw spindle (2). Note that the thickness of each nut is not uniform. Due to the crescent profile of the female thread the nuts are thicker in the portion of the middle part of the crescent thread. In other words, the "inner diameter" near the split faces of each split nut is larger than that near the middle line due to the different thread depth thereof. The outer walls (32) (32') of split nuts (3) (3') are respectively provided with notches (33) (33'), into which insert the ends of springs (4a) (4b) (4c) (4d) as well as the front ends of stop pieces (5) (5'). The tail ends (51) (51') of stop pieces urge against pins (11) (11').

As shown in FIG. 3, spring (4) is formed by folding the two ends of a strip of highly tough steel inwardly along the dash lines and bending the whole length into an arc. The arcs thus formed is fitted into the cylinder with their folded ends inserted into corresponding notches. Likewise, as shown in FIG. 4, stop piece (5) is formed by curling a slotted blank into an arc, with its head end (51) folded inwardly. The slot has two ends, including an open end (55) and a close end (54), and allows pin (11) to be inserted thereinto.

In FIG. 1A and FIG. 1B, the screw spindle is only resiliently and slidably retained by, but not engaged with split nuts, so it can slide axially (in the direction of the arrow in FIG. 1A) to any desired operating position. Yet when the screw spindle is turned an angle in clockwise direction (as shown by the arrow in FIG. 2A and FIG. 2B), the split nuts are forced to frictionally co-rotate through an angle and their outer walls (32) (32') now lean against pins (11) (11'), so that their split faces meet to construct a complete nut, and their threads now mate the threads of screw spindle. The split nuts only co-rotate with the screw spindle to the position of FIG. 2B. Now the screw spindle can only be advanced by screwing. No axial sliding is possible now, as in ordinary clamps. The reason why the co-rotation of split nuts (3) (3') and screw spindle (2) optimally stops in the position of FIG. 2B is that at this position the closed end (54) of the slot of each stop piece meet its corresponding pin (11) or (11'), and therefore prevents further co-rotation thereof. So the optimal, snuggest engaging position can be designed by properly selecting the length of slot. For this reason, the operator can rapidly secure a workpiece by firstly pushing the screw spindle to the approximate working position, and next turning it an angle in clockwise position.

To release a workpiece, the screw spindle is turned an angle in reverse (counterclock) direction. The splits nuts thus co-rotate an angle until the tail ends (51) (51') respectively meet pins (11') (11). Now the split nuts (5) (5') are no longer urged by pins (11) (11'), and the resilience and the springs and stop pieces pulls them apart from each other, resuming the state of FIG. 1B. Now the operator can directly pull the screw spindle backward to unload the workpiece.

FIG. 5 is an embodiment of this invention applied to an equidistant device.

After improved, this invention exhibits the following advantages over its precursor:

1. The spring of the parent application is divided into two separate parts which are much easier to fabricate;
2. The new design of spring can more reliably slacken the two split nuts when dismounting the workpiece;
3. When the split nuts are being released, the tail ends of stop pieces also meet the pins, therefore imparting the pins the function to release the nut.

It will be apparent from the foregoing description of my invention, that the same is subject to alteration and modification without departing from the underlying principles involved, and I accordingly, do not desire to be limited to the specific details illustrated and described except as may be necessitated by the appended claims.

I claim:

1. A rapid mechanism for selectively engaging or disengaging with a screw spindle, which, when turned an angle, in a first angular direction that leads to the axial retraction of the screw spindle, is disengaged from its engaged state and becomes axially slidable along its whole threaded length, and when turned in a second angular direction opposite to said first angular direction, is re-engaged from its disengaged state and can be continuously turned in said second direction to convert the rotation in the first angular direction into axial advancing of the screw spindle;

said mechanism comprising a hollow housing, of which the inner wall defines a substantially cylindrical cavity, in which are received a pair of semi-annular split nuts, each formed with threads and cooperatively complementary to the threads of said spindle;

said housing being so structured that when said screw spindle is received therein, the spindle is always retained in alignment with the axis of said cavity;

said cavity having a diameter greater than the outer diameter of said split nuts;

resilient means in said cavity for biasing said nuts, which resilient means is positioned between said inner wall of said housing and said split nuts, and is corotatably mounted with said split nuts;

said split nuts having at least a portion in contact with said screw spindle in its fully disengaged state and can be frictionally driven by said screw spindle to co-rotate an angle with said spindle in said second angular direction until reaching a first position where the two split nuts are fully engaged with said spindle and prevented from further corotating with the spindle in the second angular direction; and said split nuts in their fully engaged state can be driven by said screw spindle to co-rotate in said first angular direction until reaching a second position where the split nuts are fully disengaged with said screw spindle and prevented from further corotation with said screw spindle in the second angular direction; the first angular end and second angular end of a split nut exactly meeting the second angular end and first angular end of the other split nut when they are in said first, fully engaged position, thus cooperatively forming a complete nut;

the mechanism being characterized in that there are provided two opposite projections extending radially from the inner wall of said housing, the length of the radial extension of each projection corresponding to the difference between the radius of said cylindrical cavity and the outer radius of said split nuts; each of split nuts being externally provided with a stop member, said stop member being in form of a flat piece which is fixed to the external semicircular side of a split nut and co-rotate with said split nut, and is provided with an elongate slot, said slot extending a length in the direction of said external semicircular side of said split nut, the width of said slot is not less than the thickness of said projection, the first and second ends of said slot being respectively in the vicinity of the first angular end of a split nut and the middle point of its semicircular side; said resilient means comprising two springs; each of said springs being in the form of an elongate structure of metallic material bent to surround the circumference of said split nut, wherein one end of the first spring is fixed to said first angular end of the first split nut, and the other end of the first spring is fixed to the first angular end of the second split nut, whereas one end of the second spring is fixed to said first angular end of the first split nut, and the other end of the second spring is fixed to the first angular end of the second split nut, the two springs being located at the two opposite sides of the resulting nut formed by said split nuts on their mounting.

2. The rapid mechanism according to claim 1, wherein the radial dimension of the threads of each split nut decreases toward the two angular ends of each split nut, so that the inner diameter of the resultant nut formed by the two split nuts has an increasing inner diameter toward the angular ends of the split nuts.

3. The rapid mechanism according to claim 1, wherein the radial dimension of the thread decreases to zero at the first angular end of said split nut.

4. The rapid mechanism according to claim 1, wherein the radial dimension of the thread does not decrease to zero at the second angular end of said split nut.

* * * * *